United States Patent [19]

Braddock

[11] Patent Number: 4,776,300

[45] Date of Patent: Oct. 11, 1988

[54] CORRUGATED KITTY LITTER BOX

[76] Inventor: Roseita Braddock, 703 Gallup Rd., Spencerport, N.Y. 14559

[21] Appl. No.: 50,416

[22] Filed: May 18, 1987

[51] Int. Cl.$^4$ .............................................. A01K 23/00
[52] U.S. Cl. ...................................................... 119/1
[58] Field of Search ......................... 119/19, 158, 159; 135/102, 103; 229/41 R, 41 B

[56] References Cited

U.S. PATENT DOCUMENTS

| | | | |
|---|---|---|---|
| 2,036,033 | 3/1936 | Fisher | 135/102 |
| 2,792,844 | 5/1957 | Clark | 135/103 X |
| 3,190,300 | 6/1965 | Wear'n | 135/102 X |
| 3,291,373 | 12/1966 | Joyce | 229/41 R |

FOREIGN PATENT DOCUMENTS 2569084  2/1986  France ................................. 119/19

Primary Examiner—Robert Peshock
Attorney, Agent, or Firm—Shlesinger Fitzsimmons Shlesinger

[57] ABSTRACT

The litter box comprises a collapsible, corrugated housing made from a tubular, pleated wall which is closed at one end by a first panel, and which is secured at its opposite to a second panel having an opening for permitting animal ingress and egress to and from the housing, when the latter has been stretched into its expanded or erected position. A flexible curtain covers the opening when the housing is erected and is disposed to be pushed aside by an animal entering or leaving the housing. The housing may contain particulate kitty litter matter and can be disposed of, when the kitty litter has been exhausted, simply by collapsing and securing the housing in its collapsed mode. In one embodiment a cover panel is hingedly connected to the panel containing the engress/egress opening.

10 Claims, 3 Drawing Sheets

CORRUGATED KITTY LITTER BOX

BACKGROUND OF THE INVENTION

This invention relates to kitty litter boxes, and more particularly to an improved, collapsible litter box which is relatively simple and inexpensive to manufacture, ship and store, and which isolates cat feces from human contact.

There are a variety of U.S. patents covering different designs of disposable, sanitary toilets or kitty litter boxes which are utilized by cats. Reference is made, for example to U.S. Pat. Nos. 3,154,052, 3,581,975, 3,743,170, 4,553,671, 4,501,226, 4,527,511, 4,522,150 and 4,541,360. Most such boxes are designed to contain a quantity of particulate absorbent material, commonly referred to as kitty litter. In use a cat habitually goes to the box and performs its toilet in the litter. In many instances the litter is replaced after it has become used, but more often than not the boxes are designed to be disposed of after being used.

The above-noted U.S. Pat. No. 3,154,052, for example, discloses a rectangularly shaped, disposable box containing a supply of particulate absorbent material (initially packaged within the box), and disposed to be discarded or thrown away when the oft-used absorbent material no longer appears to be effective. Variations of this rectangular box are disclosed by the above-noted U.S. Pat. Nos. 3,581,975, 3,743,170 and 4,541,360.

The boxes disclosed by U.S. Pat. Nos. 4,553,671 and 4,501,226 are generally rectangular in configuration, but include inclined sidewalls. The U.S. Pat. No. 4,527,511 discloses a combination pet bath and litter box, and is extremely complicated in design. The U.S. Pat. No. 4,522,150 discloses a disposable litter box having a rounded top and a drawer-like bottom, which contains the litter, and which is removable from the upper part of the box or housing.

While the above-noted litter boxes are in many cases disposable, they all have the disadvantage that they are rather cumbersome to ship and store, and for that matter also take up a rather substantial quantity of room when they are discarded. Cat feces, in particular, carry protozoan parasites, should they come into contact with a human, they could lead to toxoplasmosis disease, and consequent brain and spinal cord inflamation. It is believed also that this could result in birth defects in unborn children, when a pregnant woman is exposed to such feces. Obviously, therefore, it is extremely important that, once a cat litter material has been used, it should be isolated from any contact with humans.

It is an object of this invention, therefore, to provide an improved, sanitary toilet or station for pet animals, including means for preventing absorbent litter material from coming into contact with humans after the station has been used.

A more specific object of this invention is to provide an improved, collapsible, kitty litter box which is extremely easy to store and to utilize, and which can be readily disposed of in a collapsed mode in which it occupies a very small space.

Still a more specific object of this invention is to provide a collapsible, corrugated-type kitty litter box which is extremely simple to manipulate and dispose of, when no longer in use.

Other objects of the invention will be apparent hereinafter from the specification and from the recital of the appended claims, particularly when read in conjunction with the accompanying drawings.

SUMMARY OF THE INVENTION

Several species of corrugated, collapsible kitty litter boxes are disclosed, one of which is circular in cross section, another of which is segmental circular in cross section, and still another of which is generally rectangular in cross section. Each is designed to contain particulate kitty litter; and each has a single ingress/egress opening covered by flexible cover flaps. Each species also has a simple handle, and in certain forms a cord which is used to secure the associated box in its collapsed (contracted) mode. The tunnel formed by the extended corrugations may be circular, nearly circular or rectangular in cross section.

The box may be made from inexpensive plastic or cardboard, and if cardboard is employed, its inner surfaces preferably are covered with a layer of waterproof plastic or the like. The corrugated tunnel section may be constructed by securing a plurality of circular wire loops in spaced, registering relation between two layers of plastic laminated or otherwise secured to each other and to the loops.

THE DRAWINGS

PREFERRED EMBODIMENTS OF THE INVENTION

Figure 1:
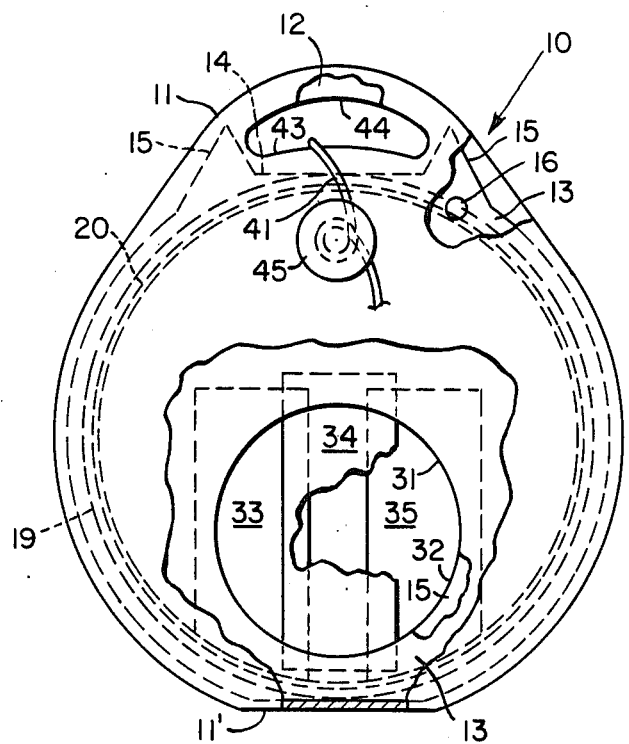
FIG. 1 is a front elevational view of a collapsed kitty litter box made according to one embodiment of this invention, portions of the box being cut away and shown in section.

Referring now to the drawings by numerals of reference, and first to FIGS. 1 to 3, 10 denotes generally a collapsible kitty litter box comprising similarly shaped front and rear panels 11 and 12 which for the most part are nearly round or circular in appearance, except that they have flat or straight lower edges 11' and 12' respectively. As shown more clearly in FIG. 2, the straight lower edge 11' of the front panel 11 actually constitutes the fold line by means of which the straight lower edge of panel 11 is hinged to the correspondingly shaped lower edge of another, smaller panel 13, which, as noted hereinafter, is adapted to constitute the front wall of the box 10 when the latter is in use.

Figure 2:
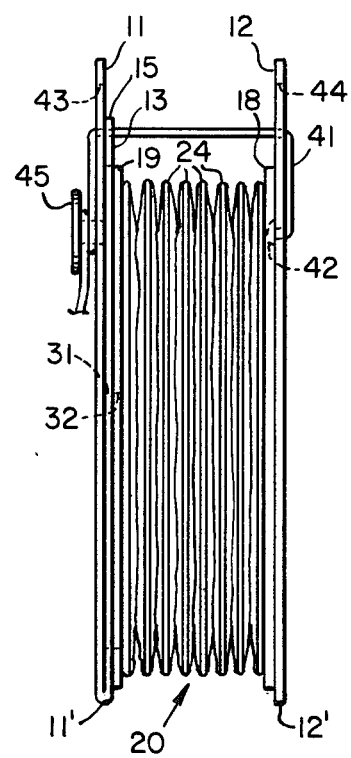
FIG. 2 is a side elevational view of this box, again being illustrated in its collapsed position.

As shown more clearly in FIG. 1, panel 13 is generally similar in appearance to, but is slightly smaller in size than the panel 11, which, when the box 10 is in its folded or collapsed position as shown in FIGS. 1 and 2, overlies or is folded back against the panel 13. The panel 13 is notched as at 14 in its upper end so as to form thereon two, upstanding projections 15 which have the appearance of cat's ears. Also, a deodorizer tablet 16

(FIG. 1) is secured in panel 13 to remove objectionable odors.

Secured to the inside or confronting surfaces of panels 12 and 13, as they are illustrated in FIG. 2, are circular, disc-shaped panels 18 and 19, respectively. Secured at opposite ends to the confronting surface of panels 18 and 19 is a corrugated duct or tunnel 20, which is circular in cross section.

Figure 3:
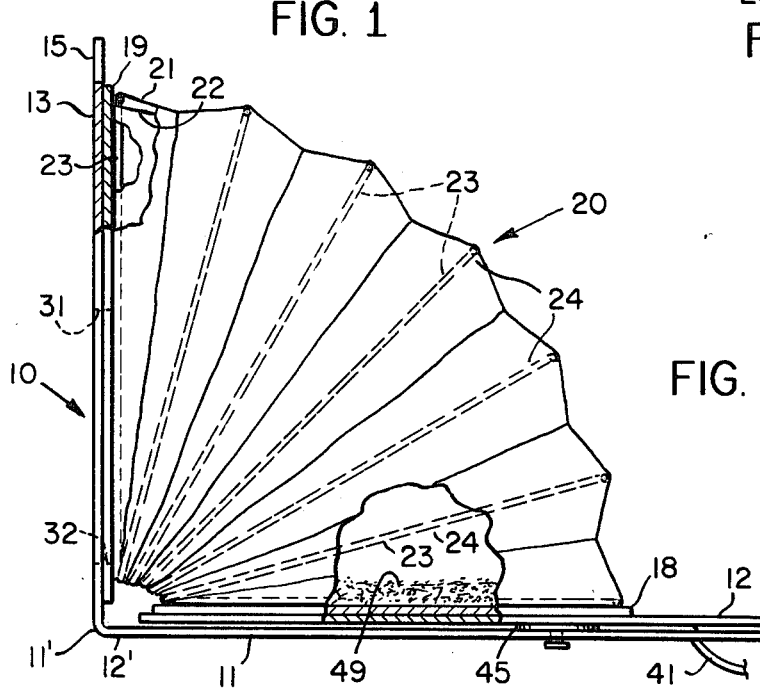
FIG. 3 is a side elevational view similar to FIG. 2, but illustrating the box in its upright or opened position, and with portions of the box being broken away and shown in section.

As shown more clearly in FIGS. 2 and 3, tunnel 20 comprises two, coaxially disposed, tubular layers 21 and 22 of thin, plastic material, which are secured one within the other, and which have a plurality of axially spaced wire loops 23 laminated or otherwise secured therebetween to form in the tunnel a plurality of spaced folds denoted at 24. Opposite ends of the tunnel 20 are fastened securely to the panels 18 and 19, so that when these particular panels are separated, the folds 24 of the corrugated tunnel 20 are free to expand as noted hereinafter.

To provide ingress and egress for the interior of the tunnel 20, the front panel 13 of the box has therein a large, circular opening 31, which registers with a like, circular opening 32 which is formed in panel 19. These openings are covered by several (three in the embodiment illustrated) flexible, plastic strips 33, 34 and 35 (FIG. 1), which are fastened at their upper edges to the inside surface of panel 19 so that they fall downwardly and in overlapping relation to each other over the registering openings 31 and 32 normally to close the latter.

In order to maintain the box 10 in its collapsed or retracted position as shown in FIGS. 1 and 2, a cord 41 is secured as at 42 beneath the back panel 12. This cord extends upwardly and laterally through (registering, hand grip openings 43 and 44 that are located in panels 11 and 12, respectively, adjacent their upper edges. It then passes downwardly over the face of the folded panel 11 where it is wound beneath a retaining disc 45 that is secured to and projects from the outer face of panel 11. The hand grip openings 43 and 44 in panels 11 and 12 register with the notch 14 which is formed in the upper edge of panel 13.

In use, the cord 41 is removed from its locking position around disc 45, and panel 11 is folded downwardly and rearwardly beneath the tunnel 20, as shown in FIG. 3. In this position, what formerly was the outer surface of panel 11, now engages against the outer surface of panel 12; and together, these two panels form the base of box 10. The box is then erected by swinging the upper edge of panel 13 away from panel 12 until panel 13 is placed in vertical plane, and at 90° to the horizontally disposed panels 11 and 12. This movement causes the tunnel 20 to expand, as shown in FIG. 3, thus forming a curved enclosure into which a cat or kitten may enter simply by passing through the registering openings 31 and 32 in panels 13 and 19, and in so doing causing the overlapping cover flaps 33, 34 and 35 to be parted as the animal enters the box. Within the box, and on the floor thereof as represented by the disc or panel 18, particulate kitty litter may be disposed in a layer 49.

After the kitty litter has been exhausted, the box 10 can be refolded to the position shown in FIG. 2 and discarded without a human once having to come into contact with any of the feces then contained in the box.

Figure 4:
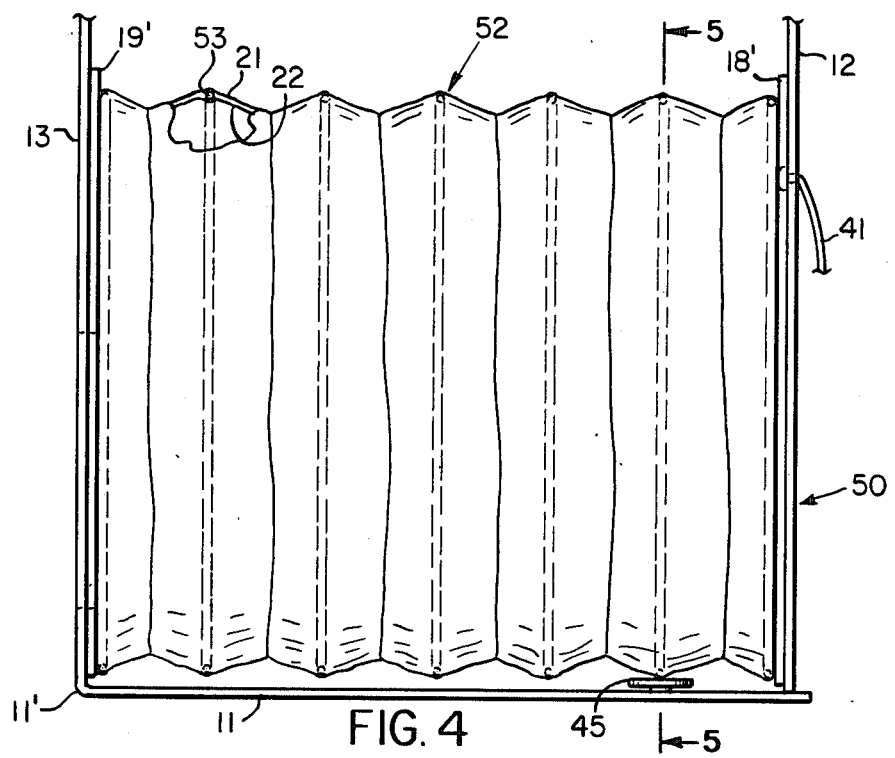
FIG. 4 is a fragmentary side elevational view of a modified form of this box shown in its opened and extended position.
Figure 5:
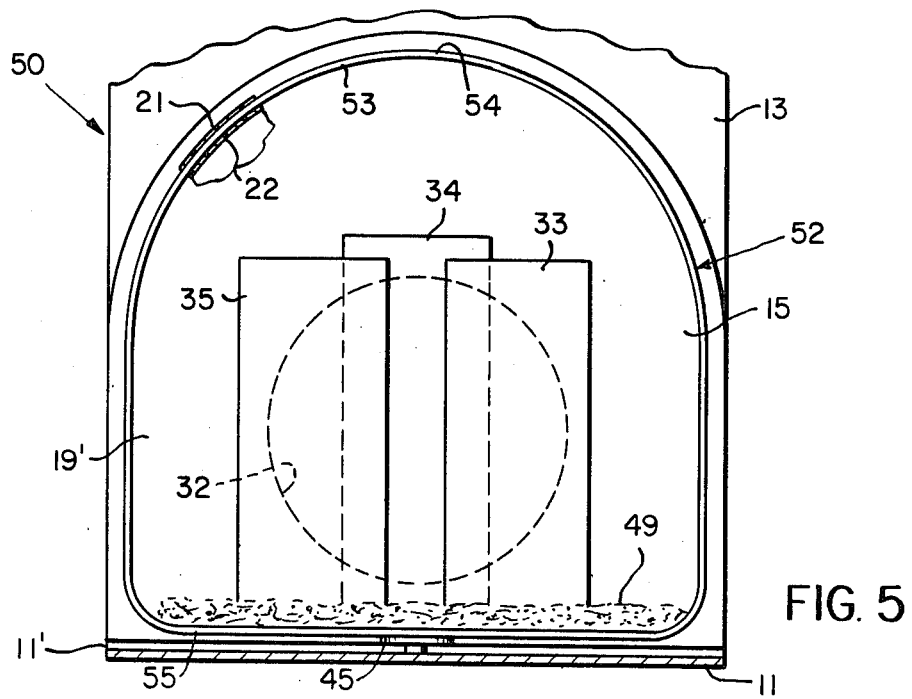
FIG. 5 is a fragmentary sectional view taken generally along the line 5—5 in FIG. 4 looking in the direction of the arrows.

Referring now to the embodiment illustrated in FIGS. 4 and 5, and wherein like numerals are employed to denote elements similar to those employed in the first embodiment, 50 denotes generally a modified kitty litter box having interconnected or hinged front panels 11 and 13 similar to those employed in the first embodiment, and a rear panel 12, which, as in the first embodiment, is similar in configuration to panel 11. Also panel 12 in this embodiment has projecting therefrom the locking cord 41, which is adapted, as in the first embodiment to be releasably wound beneath the disc 45 that projects from the face of panel 11.

The corrugated tunnel 52 of this second embodiment is similar to tunnel 21 in that it employs a pair of generally tubular layers 21 and 22 of plastic, which are laminated to each other, and which have secured therebetween a plurality of axially spaced wire hoops 53. However, instead of being circular as in the case of the hoops employed in tunnel 20, hoops 53 are instead shaped like the periphery of a conventional loaf of bread, in that each hoop 53 has a rounded upper edge 54 (FIG. 5), and a flat or straight lower edge 55. The opposite ends of tunnel 52 are fastened to panels 18' and 19', which are secured to the inner, confronting surfaces of panels 12 and 13, respectively. The tunnel supporting panels 18' and 19' also are similar in configuration to the hoops 54.

In use, panel 11 is swung downwardly beneath the corrugated tunnel section 52, as in the first embodiment. However, instead of placing the back panel 12 in a horizontal position, it is, during use, drawn rearwardly away from panel 13 while being maintained in a vertical position, or at right angles to the panel 11, so that when the litter box 51 is in its opened or erected position as shown in FIG. 4, the flat, lower edges 55 of the registering hoops 52 rest upon the panel 11, which thus forms a horizontal base for the box. In this configuration the opening formed inside the expanded tunnel 52 is similar in cross section to that of a loaf of bread; and the box thus has an elongate, flat bottom surface which is covered by a layer 49 of kitty litter. Since the panels 12 and 13 are horizontally spaced from each other, and remain in spaced, vertical planes, the overall length of the box is generally greater than that afforded by the box illustrated in FIGS. 1 to 3.

Figure 6:
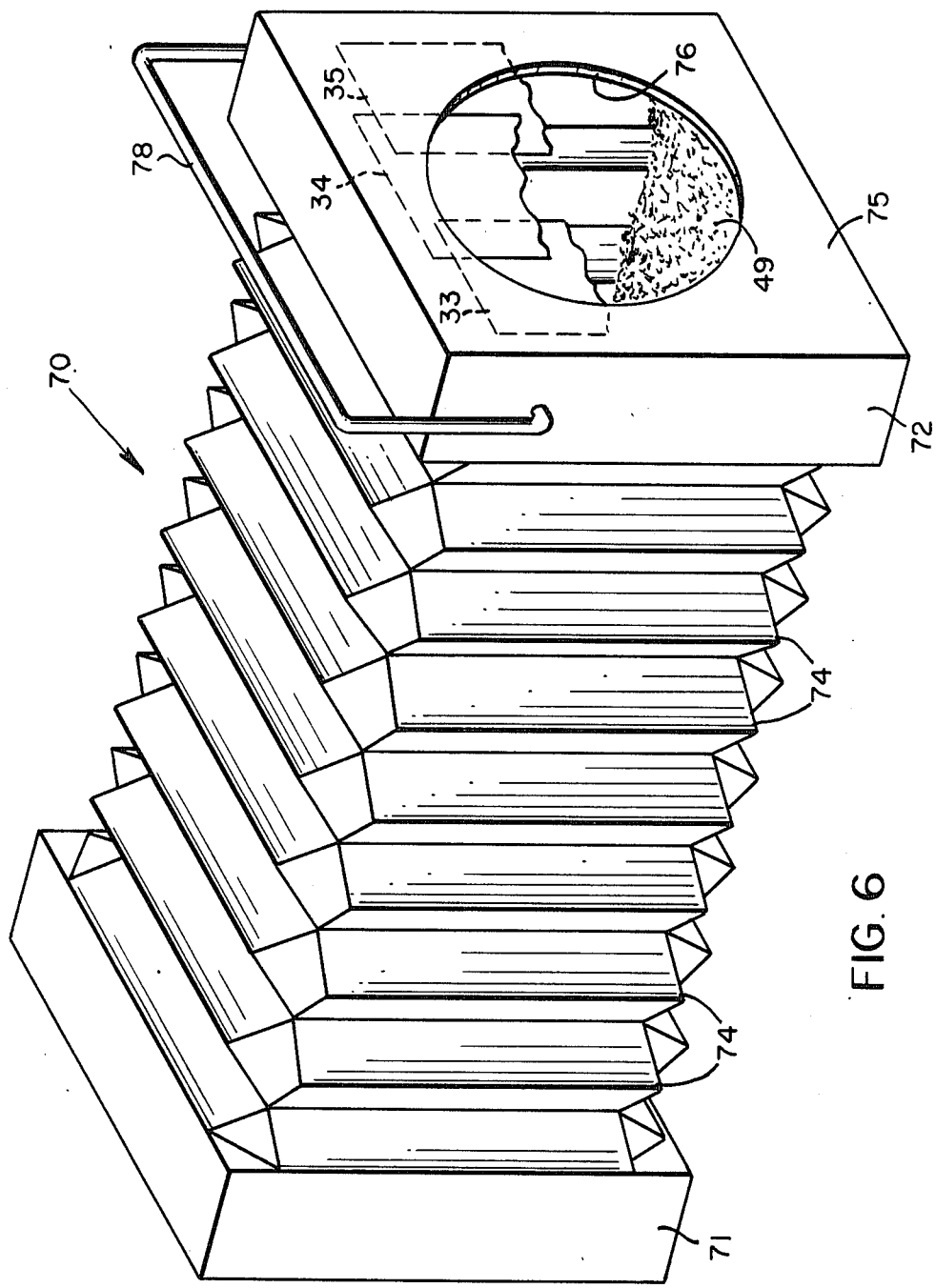
FIG. 6 is a fragmentary perspective view of still another embodiment of this invention.

Referring now to the embodiment shown in FIG. 6, again where like numerals are employed to denote elements similar to those employed in the preceding embodiments, 70 denotes still another form of a corrugated kitty litter box comprising a pair of spaced, rectangularly-shaped housing sections 71 and 72, which are interconnected by a plurality of accordian folds 74. Folds 74 permit sections 71 and 72 to be collapsed toward each other, or to be moved away from each other into a position in which the overall length of the box 71 is increased to the extent permitted by the interconnecting folds 74.

The rear housing section 71 is closed, but the forward section 72 has in its forward wall 75 a circular opening 76 to permit ingress and egress. As in the preceding embodiments, this opening 76 normally is closed by a plurality of flexible flaps, 33, 34, and 35, which are secured at their upper edges to the inside of wall 75. The box is also provided with a handle 78, and is disposed to have, as in the the preceding embodiments, a layer 49 of kitty litter distributed on its flat bottom surface. Also as in the preceding embodiments, of course, box 70 can be folded simply by compressing its folds 74, thus permitting both easy storage and disposal.

It is to be understood that the above-described boxes can be made from inexpensive materials, such as cardboard and/or plastic; and if made from cardboard, the interior of each box should be lined with plastic to prevent moisture from seeping into the cardboard. Although in the embodiments shown in FIGS. 1 to 5 it has been suggested that wire hoops be employed, it will be readily apparent that other forms of corrugation can be employed without departing from this invention.

This invention thus provides a totally disposable, self-contained, deodorized environment, which through confinement reduces or eliminates permeation of odors into an adjacent room. The design is so simple that it lends itself readily to be set up without the need for lengthy descriptive materials, nor does it require any mechanical skill on the part of one upon placing the box in use. The device itself requires no packaging, nor any additional displays; and it is versatile in that it can be packaged or sandwiched within small bags without undue risk of damage. Moreover it is possible to decorate the face of the panel 13, which is already provided with cat's ears 15 simply by printing or otherwise placing the image of a cat's face on the outer surface of panel 13.

The tunnel-like construction of applicant's novel box, with its close quarters and dark environment, is very compatible with a cat's instinctive need for solitude and protection. The box is also ecological in that all materials used in its manufacture may be biodegradable, thereby non-irritating and non-toxic to the environment. Deodorizers such as that denoted at 16, may be incorporated during the manufacturing process, thereby eliminating any need for manually implanting the deodorizer when it is placed in use. Also, the novel box can be utilized, if desired, to constitute the container for particular kitty litter products, thereby providing a novel, promotional packing device for the kitty litter.

While this invention has been illustrated in described in detail in connection with only certain embodiments thereof, it will be apparent that it is capable of still further modification, and that this application is intended to cover any such modifications as may fall within the scope of one skilled in the art or the appended claims.

I claim:

1. A collapsible, disposable, litter box for pet animals, such as kittens and the like, comprising
    a pair of panels, one of which has therethrough a generally centrally disposed opening,
    a generally tubular enclosure extending between said panels, the opening in said one panel providing an animal ingress/egress opening for said enclousure at one end thereof, and the other of said panels closing the opposite end of said enclosure,
    said enclosure comprising a flexible, tubular wall having formed therein intermediate its ends a plurality of spaced, registering, accordian-like pleats, at least portions of which pleats are movable manually and selectively toward each other to place the enclosure in a collapsed position, and away from each other to place the enclosure in an extended, erected position,
    means for supporting the erected enclosure on a plane surface with said one panel lying in a plane transverse to said surface, and
    flexible cover means mounted on said one panel to cover said opening when said enclosure is in its erected position, and disposed to be pushed aside by an animal entering or leaving said enclosure,
    said supporting means comprising a third panel hingedly connected along one edge thereof to one edge of said one panel to be swung manually into coplanar registry with the face of said one panel to close the opening therein, when said enclosure is in a collapsed position, and to be swung transverse to said one panel and beneath the erected enclosure for use in supporting the erected enclosure on said surface.

2. A litter box as defined in claim 1, wherein said panels are supported by said enclosure in intersecting, transverse planes when the enclosure is in its erected position.

3. A litter box as defined in claim 1, including a deodorizer tablet mounted in said one panel.

4. A disposable litter box for animals, comprising
    a corrugated, tubular housing having intermediate its ends a plurality of registering, interconnected folds movable manually toward and away from each other respectively to collapse and expand said housing,
    a first panel secured to and closing one end of said housing,
    a second panel secured over the opposite end of said housing and having therethrough an opening to allow an animal to enter and leave said housing,
    a third panel pivotally connected along one edge to one edge of said second panel for swinging movement about a pivotal axis into and out of a closed position in which said third panel is disposed in coplanar engagement with the face of said second panel to close the opening therein, and
    means for releasably securing said housing in its collapsed mode with said third panel secured against said face of the second panel.

5. A disposable litter box as defined in claim 4, including flexible curtain means overlying said opening in said second panel normally to close said opening when said housing is in its expanded mode, and disposed to be pushed aside by an animal entering or leaving the expanded housing.

6. A disposable litter box as defined in claim 4, wherein said housing comprises a flexible, generally tubular wall having a plurality of axially spaced hoops secured therein intermediate its ends and defining said folds.

7. A disposable litter box as defined in claim 6, wherein said first and third panels are disposed to be swung into engagement with each other and transverse to said second panel, thereby to cause the pleats of said housing to be swung about said pivotal axis upon expansion of said housing.

8. A disposable litter box as defined in claim 6, wherein
    said third panel is pivotal about said axis into a position in which said third panel extends transverse to said second panel and beneath said folds, and
    said folds are separable from each other along an axis parallel to the axis of said opening, whereby in its expanded mode said housing overlies said third panel to be supported thereby.

9. A disposable litter box as defined in claim 7, wherein said hoops are generally circular in configuration.

10. A litter box as defined in claim 8, wherein said hoops are generally semi-circular in configuration.

* * * * *